US008598858B2

(12) United States Patent
Kurokawa

(10) Patent No.: US 8,598,858 B2
(45) Date of Patent: Dec. 3, 2013

(54) PREDICTIVE CONTROL SYSTEM

(75) Inventor: Fujio Kurokawa, Nagasaki (JP)

(73) Assignee: Nagasaki University, National University Corporation, Nagasaki-Shi, Nagasaki (JP)

( * ) Notice: Subject to any disclaimer, the term of this patent is extended or adjusted under 35 U.S.C. 154(b) by 747 days.

(21) Appl. No.: 12/598,016

(22) PCT Filed: Apr. 30, 2008

(86) PCT No.: PCT/JP2008/058290
§ 371 (c)(1),
(2), (4) Date: Feb. 8, 2010

(87) PCT Pub. No.: WO2009/001615
PCT Pub. Date: Dec. 31, 2008

(65) Prior Publication Data
US 2010/0135046 A1      Jun. 3, 2010

(30) Foreign Application Priority Data

May 29, 2007   (JP) ................................. 2007-142699

(51) Int. Cl.
*G05F 1/575* (2006.01)
(52) U.S. Cl.
USPC .......................................... 323/283; 323/285

(58) Field of Classification Search
USPC .................................................... 323/283, 285
See application file for complete search history.

(56) References Cited

U.S. PATENT DOCUMENTS 6,031,361 A * 2/2000 Burstein et al. ................ 323/224
7,230,406 B2 * 6/2007 Huang et al. .................. 323/222

OTHER PUBLICATIONS

International Search Report of Int'l Application No. PCT/JP2008/058290.

* cited by examiner

*Primary Examiner* — Harry Behm
(74) *Attorney, Agent, or Firm* — Kile Park Reed & Houtteman PLLC

(57) ABSTRACT

The first sampling measurement value compares whether to exceed a prescribed threshold and judges the control part at the sampling time. The control part compares whether the first sampling measurement value exceeds a prescribed threshold. When the actual measurement value doesn't exceed a prescribed threshold, the control part predict the first sampling value at the next sampling time. [1] When the first sampling the predicting value doesn't exceed the threshold value, the status of the switch is maintained, [2] When the first sampling the predicting value exceeds the threshold value, the time when the movement of the switch should be changed is calculated and the status of the switch is changed at time concerned.

6 Claims, 8 Drawing Sheets

Fig. 6
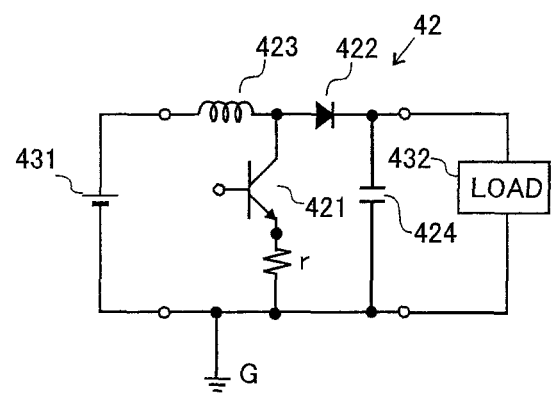
(A)
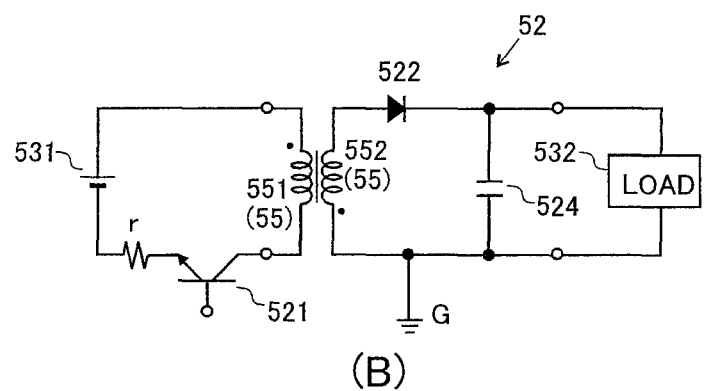
(B)

PREDICTIVE CONTROL SYSTEM

TECHNICAL FIELD

The present invention relates the predictive control system for the electric power conversion that can transfer the electric power of the input side to the output side by on-off of the switch, and relates the predictive control system for the electric power conversion that can enable a high-speed control by judging a change of the on-off status of the switch in on-time two or more times or by predicting the time of the change.

BACKGROUND ART

In the prior art to control semiconductor switching element for power supply, the control circuit memorizes the data showing the operation status of semiconductor switching element for electric power one by one as the longitudinal data. As a result, because the control delay is canceled, the voltage change caused at the turn-off (or, the turn-on) is surely controlled.

In this prior art, the operation status data that shows the operation of the semiconductor switching element for the electric power at the turn-off (or, the turn-on) is memorized one by one as the longitudinal data.

And, the control circuit predicts the operation of the semiconductor switching element for the electric power at the next turnoff (or, the turn-on) based on this operation status data.

After this, the control circuit sets the voltage at the next turnoff (or, the turn-on) so that the change of the overshoot (or, the undershoot) may decrease based on this prediction result.

Moreover, in the DC/DC converter, to achieve the quick regulation (control with a high response), the control circuit can predict the off time of the switch for the current control for instance.

The control circuit samples the current of the switch twice for on a period, and detects the increasing rate of the current, and predicts the time when the current of the switch reaches a preset threshold value (value that changes according to the load) based on this detection value, and can turn off the switch at this time.

[patent documents] JP 2006-42565

DISCLOSURE

Technical Problem

However, the control circuit that is the said cannot control the high accuracy of the μV order.
Moreover, the power-supply voltage is done to the control circuit and when the load changes rapidly the change (that is, when the said preset threshold value changes rapidly), an excellent control cannot be done.

Moreover, when the change rate of the current value changes rapidly, a past control circuit cannot do an excellent control.

The purpose of the present invention is to offer the predictive control system for the electric power conversion that can control the high accuracy of the μV order, and can respond at short time when the power-supply voltage and the load change rapidly (when the load changes rapidly and the change rate of the current value became steep).

The other purpose of the present invention is to offer the predictive control system for the electric power conversion that can detect and control in high-speed and high accuracy.

The control circuit detects and controls by assuming the high-order bits of all N bits to be virtual bits, and using only the low-order bits.

Technical Solution

1) The predictive control system for the power converter circuit that transfers the input side power to the output side by switching the switch with on-status or off-status, and that has the sampling part and the control part,
    the said sampling part detects one or more of (a), (b), (c), (d) over twice as the measurements among one cycle, wherein,
    (a) the current that flows the said switch in the power converter circuit,
    (b) the current that flows the element except the said switch in the power converter circuit,
    (c) the terminal voltage that occurs between the terminals of the said switch in the power converter circuit,
    (d) the terminal voltage that occurs between the terminals of the element except the said switch in the power converter circuit,
        the said control part
            compares and judges whether the first sampling measurement value exceeds a prescribed threshold (the threshold value set to side where the first sampling measurement value decreases, or the threshold value set to side where the first sampling measurement value increases,) downward or up at the sampling time,
        predicts the first sampling value at the next sampling time, when the sampling measurement value doesn't exceed a prescribed threshold concerned (this value is said, "The first sampling predicting value".),
    [1] when the said first sampling prediction value doesn't exceed the said threshold value, the status of the said switch is maintained,
    [2] when the said first sampling prediction value exceeds the said threshold value, calculated the time to change the status of the switch, changes the status of the switch at the time.
2) The predictive control system according to claim 1 characterized in that the said power inverter circuit is the DC/DC converter, and the actual measurement value of current to which the said first sampling measurement value flows in ON/OFF-switch.
3) The predictive control system according to claim 1, 2 characterized in that the said control part at least calculates the said first sampling predicting value by a collinear approximation or a curve approximation based on the first sampling two times of the back and forth measurement value.
4) The predictive control system according to claim 1, 2, 3 characterized in that
    the said first sampling part samples the said first sampling measurement value only by M bits of the low-order of N bits digital value,
    the said control part
    calculates the first sampling predicting value only by M bits of the low-order of N bits digital value,
    and,
    judges whether the first sampling predicting value concerned exceeds a prescribed threshold only by the said M bits.

It is desirable that the first sampling part provides with the memory (register etc.) that can be sampled with full range when there is a possibility that higher-order bits are changed.
Moreover, the first sampling part need not provide with the memory that can be sampled with full range when it understands not changing higher-order bits (or, when the possibility that higher-order bits are changed is low or extremely low).

For instance, when an actual memory is prepared only about m bits of the subordinate position of N bits when full range is N bit, it is possible to think the high-order (N-m) bits for a virtual memory to have been installed about the (N-m) bits though the memory of the reality doesn't exist.

5) The predictive control system according to claim 4 characterized in that the said control part enhances only M+2 bit the lower bit and predicts once more, when the low-order M bits of the sampling predicting value of M bits of the said low-order is 00 . . . 0, and 11 . . . 1.

6) The predictive control system according to claim 1, 2, 3, 4, 5 characterized in that the second sampling part is prepared for, and the second sampling part calculates each sampling measurement value by two or more times and the said second sampling part as the said threshold in one cycle.

7) The predictive control system according to claim 6 characterized in that the said power inverter circuit is DC/DC converter, the sampling measurement value by the said second sampling part is an actual measurement value of the voltage that appears at the both terminals of the said capacitor.

8) The predictive control system according to claim 6, 7 characterized in that the said second sampling part samples each sampling measurement value only by M bits of the low-order of N bits digital value.

Advantageous Effects

The control circuit can control the μV order in high accuracy by using the predictive control system of this invention, and even if the power-supply voltage and the load change suddenly, the control circuit can do an excellent control.

By the use of the predictive control system of this invention, when the change rate of the current value changes suddenly because the load changed suddenly, the control circuit can generate the on-timing or off-timing according to the best timing.

DESCRIPTION OF DRAWING

FIG. 6(A) is a drawing showed the boost converter of charging energy type and FIG. 6(B) is a drawing showed the buck converter of charging energy type.

Figure 1:
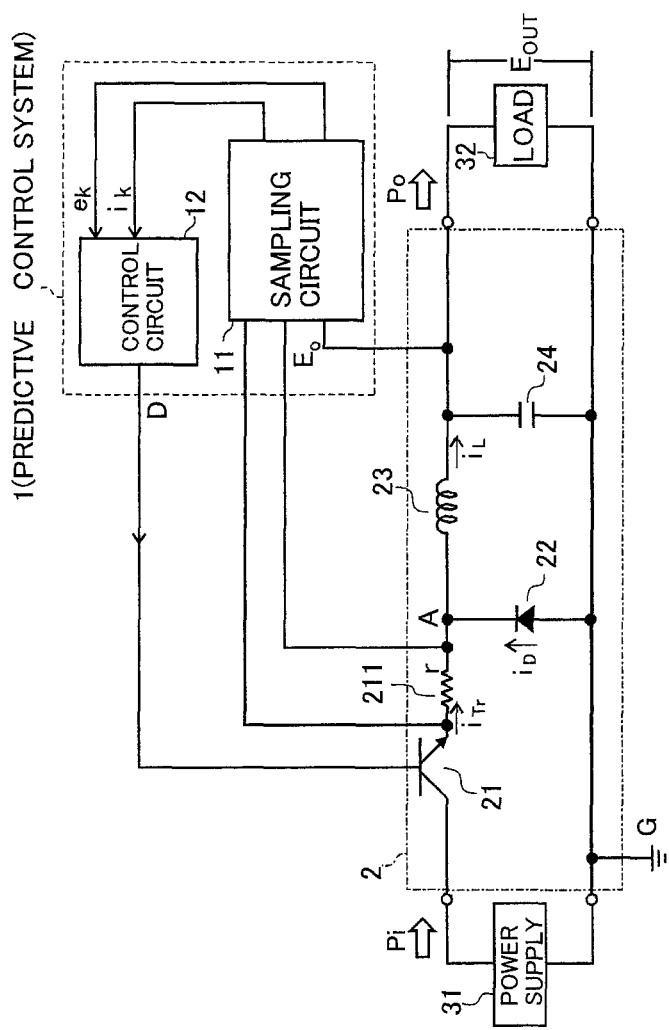
FIG. 1 is an explanatory drawing that shows one execution form of the predictive control system for the electric power conversion of this invention.

DESCRIPTION OF MAIN REFERENCE NUMERALS 1 predictive control system
2 power inverter circuit
11 sampling circuit
12 control circuit
22 flywheel diode
23 reactor
24 capacitor
31 power supply
32 load
111 switch circuit for detect voltage
112,114 AD conversion circuit current
113 switch circuit for detect current
121 digital comparison part
122 switch-off judgment part
123 predict operation part
124 driving signal generation part

BEST MODE

In the present invention, the control part judges the first sampling measurement value is below the preset threshold value at the sampling time.

Next, the control part predicts the first sampling value at the next sampling time when the first sampling measurement value is below the preset threshold value (More than a prescribed threshold).

[1] When the first sampling predictive value is below the preset threshold value (when the value is more than the preset threshold value), the status of the switch is maintained.

[2] When the first sampling predictive value exceeds the preset threshold value (at less than preset threshold value), the time to change the status of the switch is calculated, and the status of the switch is changed at the time.

Moreover, in the predictive control system of the present invention, the high-order bits of all N bits are defined as virtual bits, the low-order bits are defined as real bits.

And only the low-order bits are used for detecting and controlling.

As a result, the control part can control high speed and high accuracy. In this case, the second sampling part measures the sampling measurement corresponding to M bits of the low-order bits.

Embodiment

The embodiment of this invention is explained as follows.

FIG. 1 shows the buck converter of charging energy type.

In FIG. 1, the predictive control system 1 can transport electric power Pi on the input side to the output side by driving the switch 21 in the electric power conversion circuit 2 (the output side electric power is shown with $P_o$). The predictive control system 1 has the first sampling circuit (the first sampling part in the present invention) 11 and the control circuit (the control part in the present invention) 12. It explains details of the predictive control system 1 in FIG. 2.

In FIG. 1 the power inverter circuit consists of the on/off-switch 21 (In FIG. 1, transistor) on the power supply 31 side, the resistance 211 for current sensing from which series is connected with the switch 21, the reactor 23 on the load 32 side, the flywheel diode 22 connected between connection point A (a connection point between the resistance 211 for current sensing and the reactor 23) and ground G, the capacitor connected between the output terminal and the ground G of the reactor 23.

Figure 2:
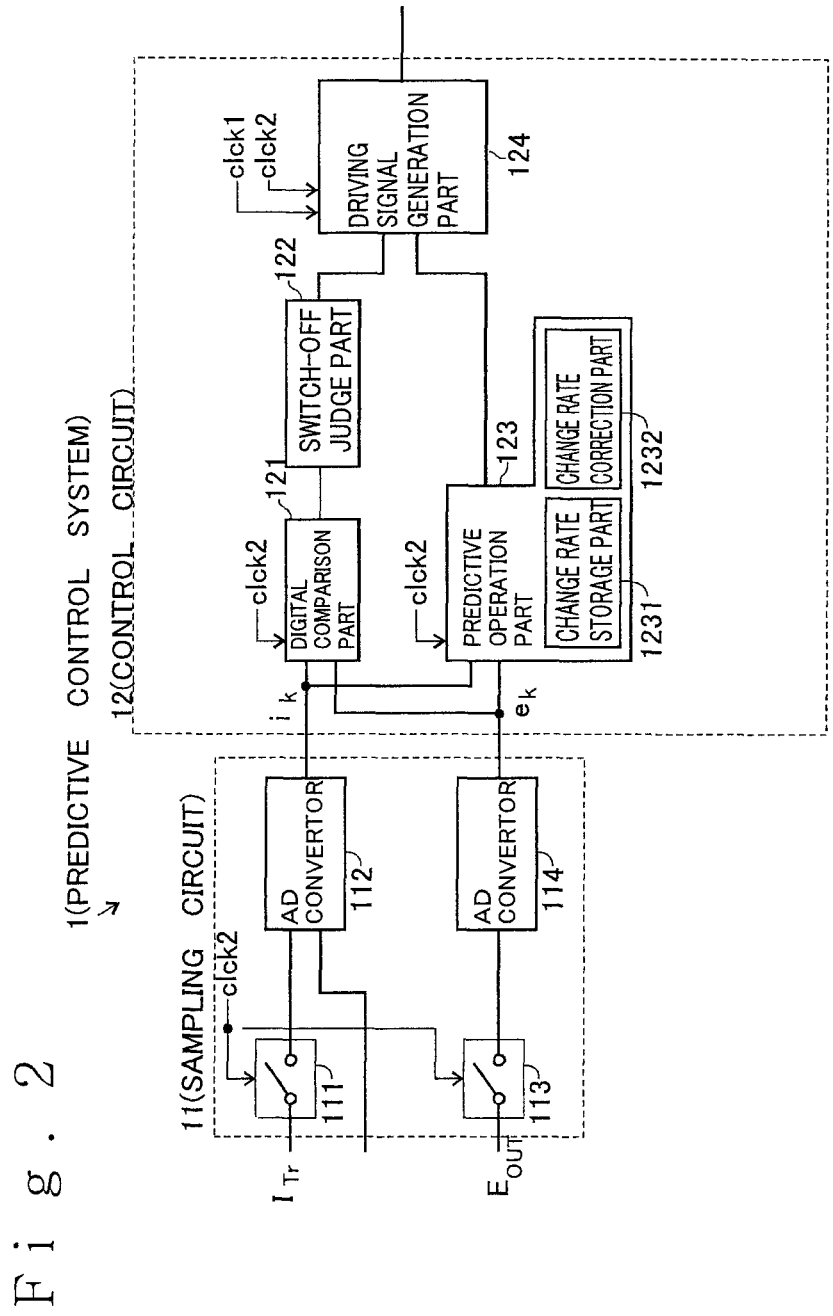
FIG. 2 is a drawing where the sampling circuit where the predictive control system of FIG. 1 is composed is shown.

As shown in FIG. 2, the predictive control system 1 has the sampling circuit 2 and the control circuit (control part in this invention) 12. The control circuit 12 inputs the output voltage $E_{OUT}$ and the descent voltage in the resistance 211 by current $i_{Tr}$, that flows in the switch 21.

In FIG. 2, the sampling circuit 11 has the switch circuit 111 for the current sensing and the analog to digital converter 112, and samples the current $i_{Tr}$ that flows in the switch 21. Moreover, the sampling circuit 11 has the switch circuit 113 for the voltage detection and the analog to digital converter 114, and samples the output voltage $E_{OUT}$ of the power inverter circuit 2. It explains details of the predictive control system 1 in FIG. 2.

The switch circuit 111 for the current sensing and the switch circuit 113 for the voltage detection can be operated based on the clock of a different frequency. In this embodiment, the switch circuit 111 for the current sensing and the switch circuit 113 for the voltage detection can be operate based on common clock CLCK2. The frequency of clock CLCK2 is 16 times the frequency of on-off clock CLCK1 of switch 21.

In FIG. 2, the control circuit 12 has the circuit that consists of the digital comparison part 121 and the switch-off judgment part 122. Moreover, the control circuit 12 has the circuit that consists of the predictive operation part 123 and the driving signal generation part 124. The digital current value $i_k$ of the A/D converter 112 is a value ($i_{Tr} \times r$) in which current $i_{Tr}$ that flows in the switch 21 is converted into the voltage value. The digital voltage value $e_k$ of the A/D converter 114 is a voltage between the terminals of load 32.

The digital comparison part 121 compares the digital current value $i_k$ and the threshold value $e_o$ (the value in which the digital voltage value $e_k$ is reversed).

Affixing character k shows the frequency of sampling. That is, affixing character k displays the order of sampling at one cycle.

For instance, the digital comparison part 121 can compare the voltage value $i_k \times r$ (the value in which the digital current value $i_k$ is converted into voltage value) and the value in which the offset was added to the digital voltage value $e_k$.

In this embodiment, to explain easily, the offset is set to 0.

The predictive operation part 123 contains the change rate storage part 1231 and the change rate correction part 1232. The change rate storage part 1231 can memorize the change rate of the current $i_{Tr}$ (that is, the change rate of the current value $i_k$).

Moreover, when the said change rate changes the change rate correction part 1232 can update the change rate at once.

The driving signal generation part 124 generates signal D as shown in FIG. 1, and the signal D is sent to the control terminal of the switch 21.

Figure 3:
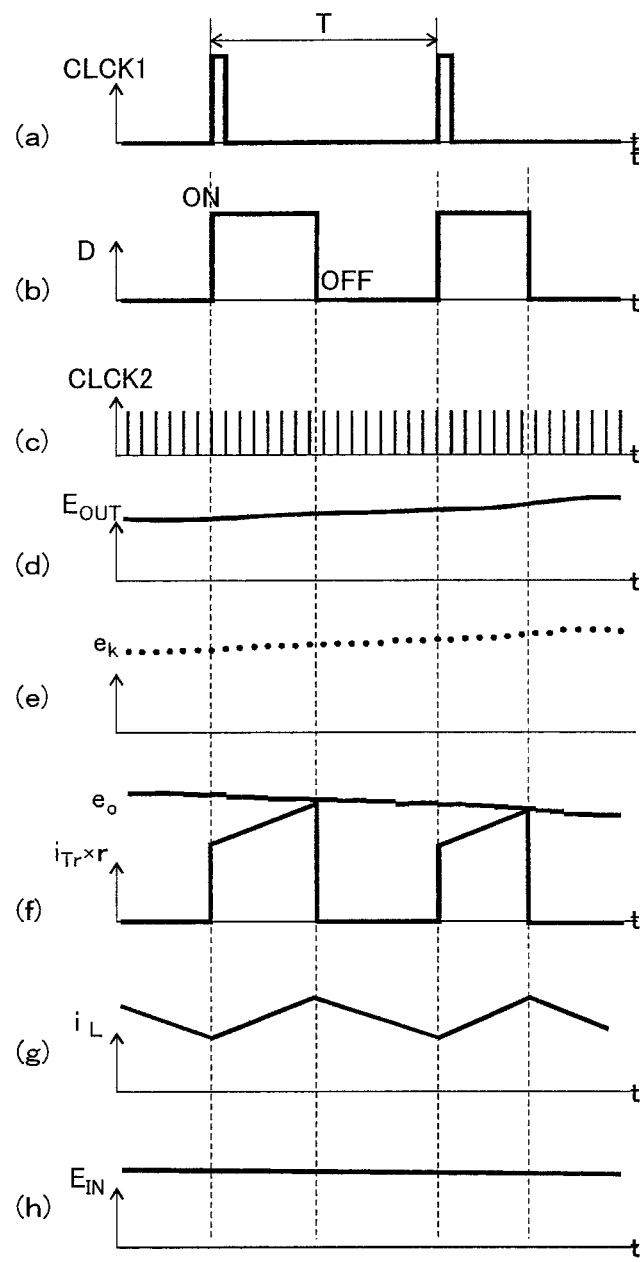
FIG. 3 (a), (b), (c), (d), (e), (f), (g), (h) are timing charts that show the operation of the predictive control system of FIG. 1.

It explains the movement of the predictive control system 1 that shows in FIG. 1 and FIG. 2 referring to the timing chart of FIG. 3.

When the switch 21 begins operating (when the cycle of on-off begins), the driving signal generation part 124 changes the switch 21 in the electric power conversion circuit 2 to on-status.

FIG. 3(a) shows the pulse that produces the period T. FIG. 3(b) shows the signal D generated with the driving signal generation part 124 to drive switch 21. Switch 21 is on driven by the signal at a prescribed level.

As mentioned above, the output $E_{OUT}$ of the power conversion circuit 2 (refer to FIG. 3(d)) is sampled by the clock CLCK2, and the current $i_{Tr}$ that flows in switch 21 is sampled by clock CLCK2, too (refer to FIG. 3(f)).

In FIG. 3(f), the threshold value corresponding to the output $E_0$ of the electric power conversion circuit 2 is shown by $e_0$, and (current $i_{Tr}$)$\times r$ and $e_0$ are compared.

The current $i_L$ of the reactor 23 is shown in FIG. 3(g), and the output voltage $E_{IN}$ of the power supply 31 is shown in FIG. 3(h).

Figure 4:
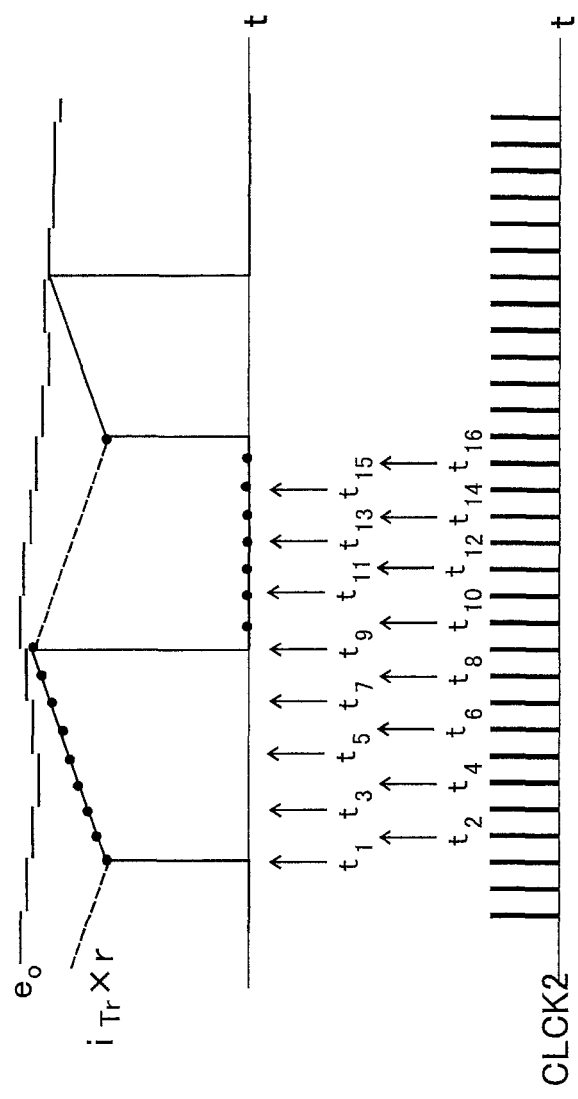
FIG. 4 is a close-up of FIGS. 3(c) and (f).

As shown in FIG. 4 (the magnified figure of FIGS. 3(c) and (f)), the digital comparison part 121 can judge at sampling time t1, t2, . . . , t15, t16 whether the sampling measurement value detected with the sampling circuit 11 exceeded the threshold value $e_0$ or doesn't exceed it.

When the sampling measurement value turns over threshold value $e_0$, the driving signal generation part 124 sets the signal D sent to the switch 21 to 0 level, and turns off the switch 21.

When the sampling measurement value doesn't exceed the threshold value $e_0$, the sampling value at the next sampling time (or the time that passes prescribed time at δt the next sampling time) is predicted.

The sampling part can predict the sampling value by the collinear approximation based on the change rate of the sampling value. The sampling value can be predicted by a curve approximation of the exponential curve etc.

In the present invention, the sampling value in the second sampling can be predicted at the sampling time of the first time (for instance, the change rate is set in a specific value).

Moreover, in the present invention, it can be judged only whether the sampling measurement value exceeds threshold e0, and the sampling value is able not to be predicted. In this case, when the second sampling is done the next sampling value is predicted. The next sampling value is predictable based on the change rate of this sampling value to the last sampling value.

When the sampling predictive value doesn't exceed the threshold value $e_0$, the on-status of the switch is maintained, and when the sampling predictive value exceeds threshold value $e_0$, the time when the switch should be turned off is calculated and the said switch is turned off at the time concerned.

The sampling circuit 11 detects the sampling value only by the low-order M bits of the N bits digital value, and the control circuit 12 can predict the sampling value based on the detection value.

Figure 5:
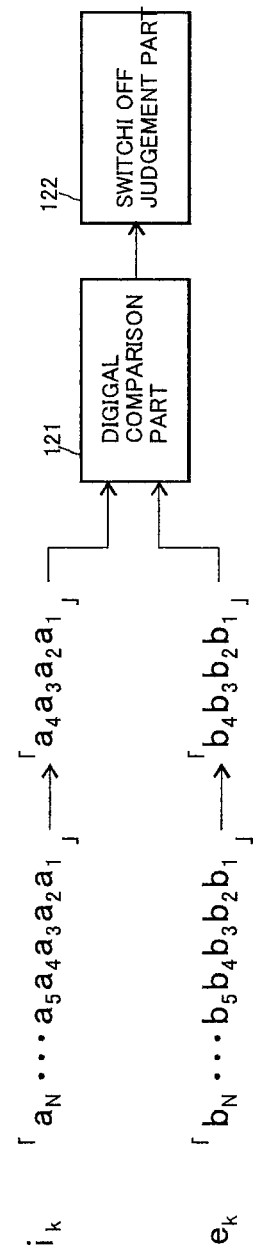
FIG. 5 is a drawing where the digital comparison circuit used with the predictive control system of this invention is shown.

In FIG. 5, sampled current value $i_k$ is indicated by $a_N \ldots a_4 a_3 a_2 a_1$, and sampled voltage value ek is indicated by $b_N \ldots b_4 b_3 b_2 b_1$.

The digital comparison part 121 consists of the comparison part 1211 and the judgment part 1212. The judgment part 1212 can judge whether the predicting is proper (hit) or is suitable and positive (come off) based on the comparative result that the comparison part 1211 has done (judge it the comparative result's whether it being included within the prescribed range).

In FIG. 5, because the low-order bits $(a_4 a_3 a_2 a_1)$ of the current value $i_k(a_N \ldots a_4 a_3 a_2 a_1)$ and the voltage value $e_k$ $(b_N \ldots b_4 b_3 b_2 b_1)$ and $(b_4 b_3 b_2 b_1)$ are compared mutually, more high-speed processing can be done.

The digital comparison part 121 can input only the low-order M bits of the N bits digital value of the sampling circuit 11.

In this case, the control circuit 12 executes sampling as the low-order M bits of the N bits digital value.

And, when low-order M bits of this sampling measurement value is "00 . . . 0", the prediction zone is enhanced.

Moreover, when low-order M bits of this sampling measurement value is "11 . . . 1", the prediction zone is enhanced, too.

The false detection can be canceled by this processing.

For instance, when it is N=8, and M=4, sampling circuit 11 is assumed to be assumed that the sampling value is between "1111 1111" from "1111 0000".

It is assumed that "0110" was detected as a result of detecting only four bits of the low-order. Because the prediction proves right in this case, the measurement zone (measurement range) need not be enhanced.

It is assumed that "0000" was detected as a result of detecting only four bits of the low-order. In this case, the value might be actually "1111 0000", and might be the value following "1110 1111". Therefore, the range of detection is enhanced and detection is done over again.

The low-order bits of the measured data are enhanced in this case only by one bit (Three bits "111" of the high rank are not changed).

Therefore, the precise detection is performed as long as the measurement value is between "1111 1111" from "1110 0000".

On the other hand, it is necessary to have detected "0110" with the sampling circuit 11 as a result of detecting only four bits of the low-order. In this case, the value might be actually "1110 0000", and might be the value following "1101 1111". Therefore, the range of detection is assumed enhancing and detection is done over again.

If the range of detection is enhanced in this case by two bits and it detects it, the precise detection is performed as long as the value is in the range between "1111 1111" from "1100 0000".

In this example, it enhances it by two bits. The reason is that two bits change if only "1" reduces "1110 0000" (the value at this time is "1101 1111").

As described above, enhancing two bits are needed when an actual value is predicted only by the low-order M bits of N bits digital value of the sampling circuit 11.

In the said embodiment, it explained the example of controlling the current of the switch detecting the output voltage and the current of the switch respectively. The present invention is not limited to the embodiment.

In the use of the predictive control system for the power inverter circuit of this invention, the control part detect the instantaneous values of the input voltage, the output voltage, or the switch current (or the reactor current), or the output current and the control part can control the switch current.

For instance, the current $i_L$ that flows in reactor 23 and the current $i_D$ that flows in flywheel diode 22 can be sampled in place of sampling the current $i_{Tr}$ that flows in switch 21. This value is compared with the detection value $e_0$ of the output of electric power conversion circuit 2, and off timing of switch 21 is guessed.

In the said embodiment, it explained the case where the predictive control system of the present invention is applied to "the buck converter of charging energy type".

The predictive control system of this invention can be applied to "the boost converter of charging energy type" shown in "the boost converter of charging energy type" shown in FIG. 6(A) and FIGS. 6(A) and (B).

In the electric power conversion circuit 42 of FIG. 6(A), the reactor 423 is connected with the series in the power supply 431, and the switch 421 is connected with the series circuit of the power supply 431 and the reactor 423 in parallel.

Moreover, capacitor 424 is connected with load 432 in parallel on the output side.

Between connection point A of switch 421 and reactor 423 and connection point B of capacitor 424 and load 432 (the ground G is a point on the other side), diode 422 is connected with directions of easy flow.

The resistance r for the current sensing is installed in switch 421 as shown in FIG. 6(A) and it is possible to install it in the series. Moreover, the output voltage of electric power conversion circuit 42 can be detected from the latter part of diode 422 (the connection point of diode 422, the capacitor 424, and the load 432).

In the electric power conversion circuit 52 of FIG. 6(B), the primary winding 551 of the transformer 55 and the switch 521 are connected with the series in the power supply 531.

Moreover, the diode 522 is connected with the series (forward direction connect), and the capacitor 524 and the load 532 are connected in parallel between the output terminal and the ground G of the diode 522 in the secondary winding 552 of transformer 55.

Resistance r for the current sensing can be installed in the switch 521 as shown in FIG. 6(B), it install in the series, and the output voltage of the electric power conversion circuit 52 can be detected from the latter part of diode 522 connection point of diode 522, capacitor 524, and load 532).

Figure 7:
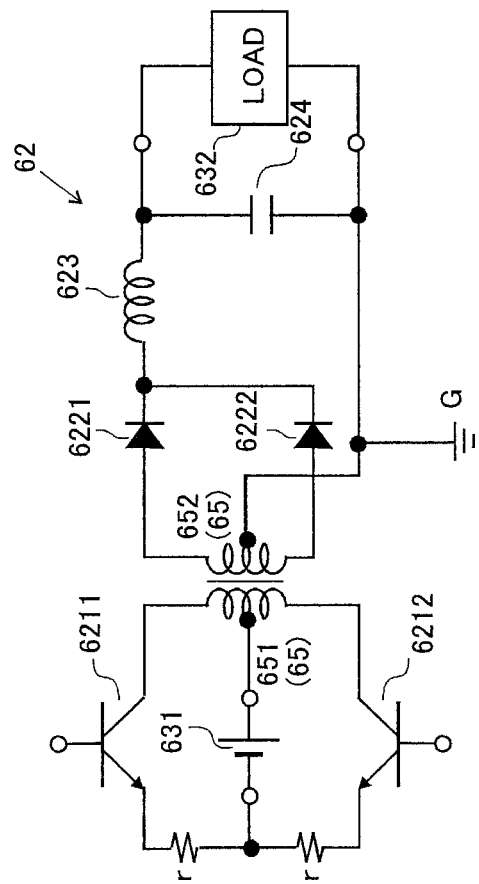
FIG. 7 is a drawing where the inverter rectification type circuit applied to this invention is shown.
Figure 8:
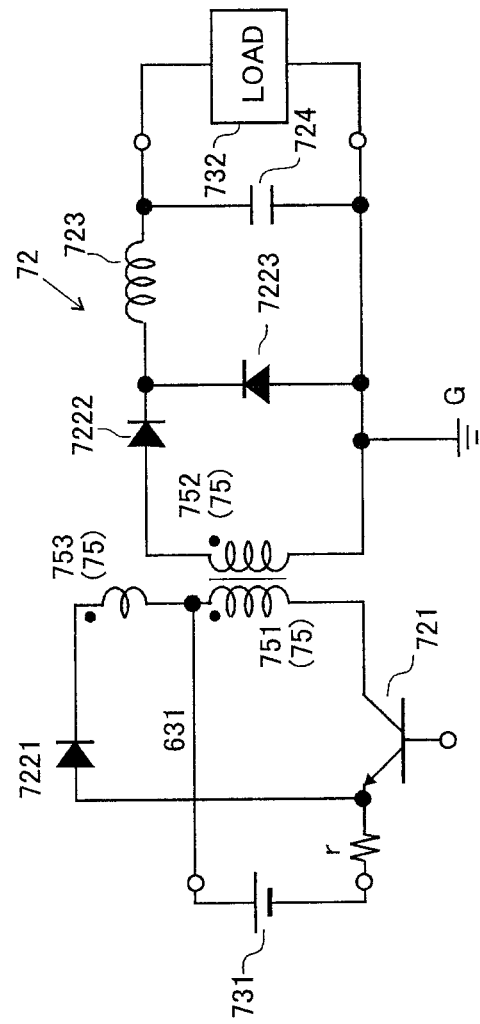
FIG. 8 is a drawing the forward circuit applied to the present invention is shown.

In addition, the present invention can be applied to the inverter rectification type circuit shown in FIG. 7, and can be applied also to the forward circuit shown in FIG. 8.

The other terminal of power supply 631 is connected with the center tap in the primary winding 651 of transformer 65 in the inverter rectification type circuit 62 of FIG. 7, switch 6211 is connected between the other terminals of terminal and transformer 65 on playground G side of power supply 631, and switch 6212 is connected between the terminal on playground G side of power supply 631 and the other terminal in the primary winding 651.

In the inverter rectification type circuit 62 of FIG. 7, a terminal of power supply 631 is connected with the center tap in the primary winding 651 and a terminal of transformer 65.

The switch 6211 is connected between the terminal on the ground G side of the power supply 631 and a terminal of transformer 65.

Switch 6212 is connected between the terminal on the ground G side of power supply 631 and the other terminal in the primary winding 651.

The diode 6221 and the diode 6222 are connected with both terminals in the secondary winding 652 of the transformer 65 (The connect direction is forward direction.).

The cathode of these diodes is connected with the other terminal respectively of reactor 623.

The other terminals of reactor 623 are connected with the parallel connect circuit that consists of the capacitor 624 and the load 632.

The terminal on the ground G side of this parallel connect circuit is connected with the center tap in the secondary winding 652 of transformer 65

The resistance r for the current sensing is installed in switch 6211, 6212 as shown in FIG. 7 and it is possible to install it in the series. It is possible to install it in the series in the power supply 631 though the resistance r for the current sensing is not shown in the figure.

Moreover, the output voltage of electric power conversion circuit 62 can be detected from the latter part of the reactor 623 (connection point of reactor 623, capacitor 624, and load 632).

In the inverter rectification type circuit 62 of FIG. 7, the processing explains from FIG. 1 in FIG. 5 is done about the shape of waves that shifts for instance by 180° and is output alternately.

In the forward type circuit 72 of FIG. 8, the series circuit of the power supply 731 and the switch 721 is connected with the primary winding 751 of transformer 75 (consists of the primary winding 751 and the secondary winding 752 and the tertiary winding 753).

As described later, the diode 7222 is connected with the secondary winding 752 of the transformer 75.

The diode 7221 is connected between the connection point (the connection point of the power supply 731 and the switch 721) and the input terminal in the tertiary winging 753 of transformer 75 (The connect direction is forward direction.).

The primary winding 751 and the tertiary winding 753 are mutually shorted. Moreover, the secondary winding 752 of the transformer 75 is insulated with the primary winding 751 and the tertiary winding 753. And, the electric power is transferred between the primary winging 751 and the tertiary winding 753.

The other terminal of the reactor 723 is connected with the cathode terminal of the diode 7222.

The other terminal of the reactor 723 is connected with the parallel connected circuit of capacitor 724 and load 732.

Moreover, the flywheel diode 7223 is connected between the connection point (the connection point of diode 7222 and the reactor 723) and the grounds G.

The resistance r for the current sensing is installed in switch 721 as shown in FIG. 8 and it is possible to install it in the series.

Moreover, the output voltage of electric power conversion circuit 72 can be detected from the latter part of the reactor 723 (connection point of the reactor 723, the capacitor 724, and the load 732).

Moreover, the predictive control system that is the said might drive two or more power inverter circuits (DC/DC converter etc.) in parallel.

In this case, a certain prescribed value A is calculated based on the detection value of two or more voltages and the currents. And, when this value is compared with a preset threshold B, and the value A reaches the preset threshold B, the state of the switch can be changed.

Concretely, the control part detects the output current or the output voltage and the output current of two or more converters. Next, the control part does the calculation (for instance, mean value), and requests the threshold. And, the control part can do the switch of each converter on-off by comparing this threshold with the current or the voltage and the current of each converter.

In the current type converter, there is something that hysteresis that assumes the peak value and the bottom value of the triangle corrugate of the current of the reactor to be a threshold and decides on off operates. In such a converter, when there is a threshold respectively about two or more detection values, and of each reaches the threshold, the state of the switch can be changed.

INDUSTRIAL APPLICABILITY

The control part judges whether to change the on-off status of two or more times and switches during on time of the switch in the power inverter circuit, and predicts the time when the on-off status of the switch should be changed according to this judgment result. As a result, the control part can do a high-speed control.

The invention claimed is:

1. A predictive control system for a power converter circuit that transfers an input side power to an output side power by switching a switch to on-status or off-status, the predictive control system comprising:
   a sampling part that detects one or more of (a), (b), (c), (d) as two measurements in one cycle:
   (a) a current that flows through the switch of the power converter circuit,
   (b) a current that flows through an element except for the switch,
   (c) a terminal voltage that occurs between terminals of the switch, and
   (d) a terminal voltage that occurs between terminals of the element except for the switch; and
   a control part that
      compares and judges whether a first sampling measurement value exceeds a prescribed threshold value, and
      predicts a first sampling prediction value at a next sampling time, when the sampling measurement value does not exceed the prescribed threshold value,
   wherein when the first sampling prediction value does not exceed the prescribed threshold value, the status of the switch is maintained,
   wherein when the first sampling prediction value exceeds the prescribed threshold value, the status of the switch is changed,
   wherein the power converter circuit is a DC/DC converter, and the first sampling measurement value is an actual measurement value of current that flows in the switch, and
   wherein the control part at least calculates the first sampling prediction value by a collinear approximation or a curve approximation based on two previous sampling measurement values.

2. The predictive control system according to claim 1, wherein
   a first sampling part samples the first sampling measurement value only by M bits of low-order of N bits digital value,
   the control part
      calculates the first sampling prediction value only by M bits of low-order of N bits digital value, and
      judges whether the first sampling prediction value exceeds the prescribed threshold value only by the M bits.

3. The predictive control system according to claim 2, wherein the control part enhances only M+2 bits and predicts once more, when the low-order M bits of the sampling prediction value of M bits of the low-order is 00 . . . 0, and 11 . . . 1.

4. The predictive control system according to claim 1, wherein a second sampling part is prepared for, and the second sampling part calculates each sampling measurement value by two or more times and the second sampling part as a threshold value in one cycle.

5. The predictive control system according to claim 4, wherein
   the power converter circuit is a DC/DC converter, and
   the sampling measurement value by the second sampling part is an actual measurement value of voltage that appears at both terminals of a capacitor.

6. The predictive control system according to claim 4, wherein the second sampling part samples each sampling measurement value only by M bits of the low-order of N bits digital value.

* * * * *